(12) United States Patent
Lee et al.

(10) Patent No.: US 10,343,923 B2
(45) Date of Patent: Jul. 9, 2019

(54) SYSTEM FOR PREPARING SILICA AEROGEL

(71) Applicant: LG CHEM, LTD., Seoul (KR)

(72) Inventors: Dong Kwon Lee, Daejeon (KR); Ye Hon Kim, Daejeon (KR); Jong Ku Lee, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/742,865

(22) PCT Filed: Mar. 7, 2017

(86) PCT No.: PCT/KR2017/002451
§ 371 (c)(1),
(2) Date: Jan. 8, 2018

(87) PCT Pub. No.: WO2017/164543
PCT Pub. Date: Sep. 28, 2017

(65) Prior Publication Data
US 2018/0370809 A1    Dec. 27, 2018

(30) Foreign Application Priority Data
Mar. 24, 2016 (KR) .................. 10-2016-0035566

(51) Int. Cl.
*B01J 8/00* (2006.01)
*C01B 33/158* (2006.01)
(Continued)

(52) U.S. Cl.
CPC ............ *C01B 33/1585* (2013.01); *B01D 3/14* (2013.01); *B01D 5/006* (2013.01); *B01D 5/0045* (2013.01); *C02F 1/52* (2013.01)

(58) Field of Classification Search
CPC .................. C01B 33/152; B01J 8/00
(Continued)

(56) References Cited

U.S. PATENT DOCUMENTS

| 6,013,821 A | 1/2000 | Lopez | |
|---|---|---|---|
| 2010/0119432 A1* | 5/2010 | Yeo | C01B 33/1585 423/338 |
| 2012/0244040 A1* | 9/2012 | Joung | C01B 33/1585 422/119 |

FOREIGN PATENT DOCUMENTS

| EP | 2722311 | 4/2014 |
|---|---|---|
| KR | 10-0848856 | 7/2008 |

(Continued)

*Primary Examiner* — Huy Tram Nguyen
(74) *Attorney, Agent, or Firm* — Dentons US LLP

(57) ABSTRACT

The system for preparing silica aerogel comprises a raw material supply part transferring at least one raw material of de-ionized water, water glass, a surface modifier, an inorganic acid, and an organic solvent to a mixing part, the mixing part mixing the raw materials transferred from the raw material supply part to produce silica wet gel, a separating part separating at least one raw material of the raw materials from the mixture containing the silica wet gel transferred from the mixing part, a drying part drying the silica wet gel transferred from the separating part to produce the silica aerogel, a recovery part recovering a portion of the vaporized raw material of the raw materials used in at least one of the mixing part and the drying part, and a heat transfer part transferring heat to at least one of the mixing part and the drying part.

10 Claims, 3 Drawing Sheets

(51) Int. Cl.
*C02F 1/52* (2006.01)
*B01D 3/14* (2006.01)
*B01D 5/00* (2006.01)

(58) Field of Classification Search
USPC .................................................. 422/119, 162
See application file for complete search history.

(56) References Cited

FOREIGN PATENT DOCUMENTS

| KR | 10-1082982 | 11/2011 |
|----|------------|---------|
| KR | 10-2012-0030791 | 3/2012 |
| KR | 10-2014-0050867 | 4/2014 |
| WO | 2008143384 | 11/2008 |

* cited by examiner

SYSTEM FOR PREPARING SILICA AEROGEL

CROSS-REFERENCE TO RELATED APPLICATION

This application is a National Stage Application of International Application No. PCT/KR2017/002451 filed on Mar. 7, 2017, which claims priority to and the benefit of Korean Patent Application No. 10-2016-0035566, filed on Mar. 24, 2016, both of which are incorporated herein in their entirety by reference for all purposes as if fully set forth herein.

TECHNICAL FIELD

The present invention relates to a system for preparing silica aerogel, and more particularly, to a system for preparing silica aerogel, which significantly increases in recovery rate of a used raw material and is reduced in energy cost required for preparing the silica aerogel to efficiently prepare the silica aerogel.

BACKGROUND ART

Silica aerogel has a chemical formula expressed as $SiO_2 \cdot nH_2O$, high porosity of 90% to 99.9%, and a pore size of 1 nm to 100 nm. The silica aerogel may be a material a high specific surface area with super porosity of 600 $m^2/g$.

Since silica aerogel has a nanoporous structure and a very large surface area, the silica aerogel may have very excellent water and alcohol absorption ability and thus be used as very superior dehumidifying agent and utilized as an ultra light and super thermal insulation material, a catalyst carrier, and a super insulation material.

In spite of a vast range of application, the silica aerogel is extremely limited in use.

The core technology in a process for preparing the silica aerogel is a drying process technology that is capable of drying the wet gel without being contracted while maintaining a structure of the silica wet gel as it is. A representative drying method is a super critical drying process. However, since the super critical drying process has many limitations in terms of economical efficiency and continuity because of using an autoclave that has high production costs and high risks due to a high pressure and is impossible to continuously operate. In addition, there are disadvantages that not only risk factors are comprised in the manufacturing process, but also the manufacturing costs are high due to the complicated manufacturing process.

Although there are commercially available techniques for drying the silica wet gel at a normal pressure in preparation for such disadvantages, there is a disadvantage in that a large amount of liquid exists inside and outside the silica wet gel, and thus, large drying costs are required for drying the silica wet gel.

Also, since many raw materials are used for preparing the silica aerogel, it is urgently required to develop a technique for reusing the raw materials. For this, many suggestions with respect to techniques and operating conditions for separation purification so as to reuse the used raw materials may also be necessary.

PRIOR ART DOCUMENTS

Korean Patent Registration No. 10-1082982

DISCLOSURE OF THE INVENTION

Technical Problem

Therefore, the present invention has been made to solve the abovementioned problems, and an object of the present invention is to provide a system for preparing silica aerogel, which significantly increases in recovery rate of a used raw material and is reduced in energy cost required for preparing the silica aerogel to efficiently prepare the silica aerogel.

Technical Solution

The system for preparing silica aerogel according to the present invention comprises a raw material supply part transferring at least one raw material of de-ionized water, water glass, a surface modifier, an inorganic acid, and an organic solvent to a mixing part, the mixing part mixing the raw materials transferred from the raw material supply part to produce silica wet gel, a separating part separating at least one raw material of the raw materials from the mixture containing the silica wet gel transferred from the mixing part, a drying part drying the silica wet gel transferred from the separating part to produce the silica aerogel, a recovery part recovering a portion of the vaporized raw material of the raw materials used in at least one of the mixing part and the drying part, and a heat transfer part transferring heat to at least one of the mixing part and the drying part.

Advantageous Effects

The system for preparing the silica aerogel according to the present invention may comprise the raw material supply part, the mixing part, the separating part, the drying part, the recovery part, and the heat transfer part to significantly improve the recovery rate of the used raw materials and reduce the energy costs required for preparing the silica aerogel, thereby efficiently preparing the silica aerogel.

MODE FOR CARRYING OUT THE INVENTION

Preferred embodiments of the present invention will be described below in more detail with reference to the accompanying drawings. However, the present invention is not limited to the embodiments below.

Figure 1:
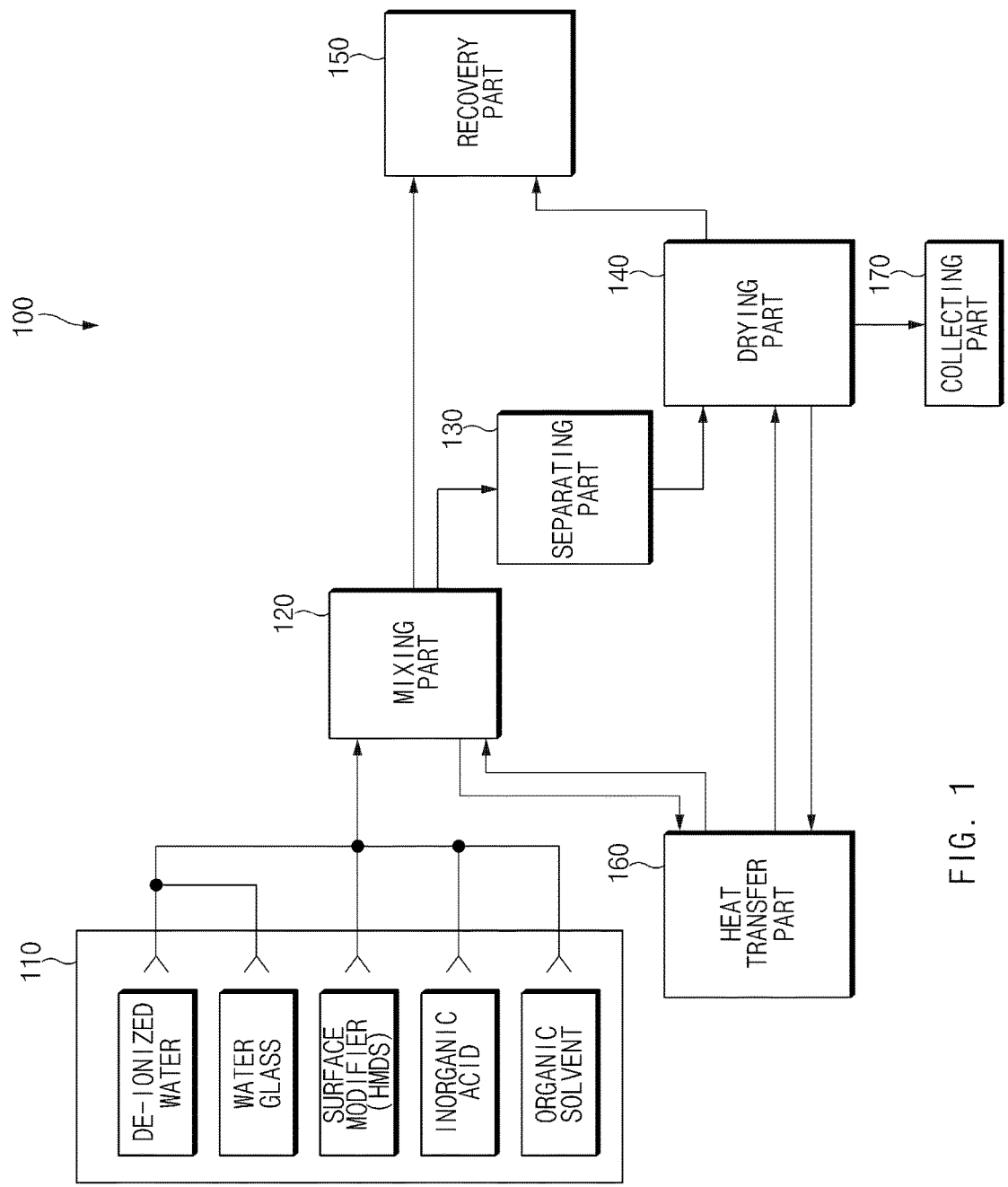
FIG. 1 is a block diagram illustrating a system for preparing silica aerogel according to an embodiment of the present invention.
Figure 2:
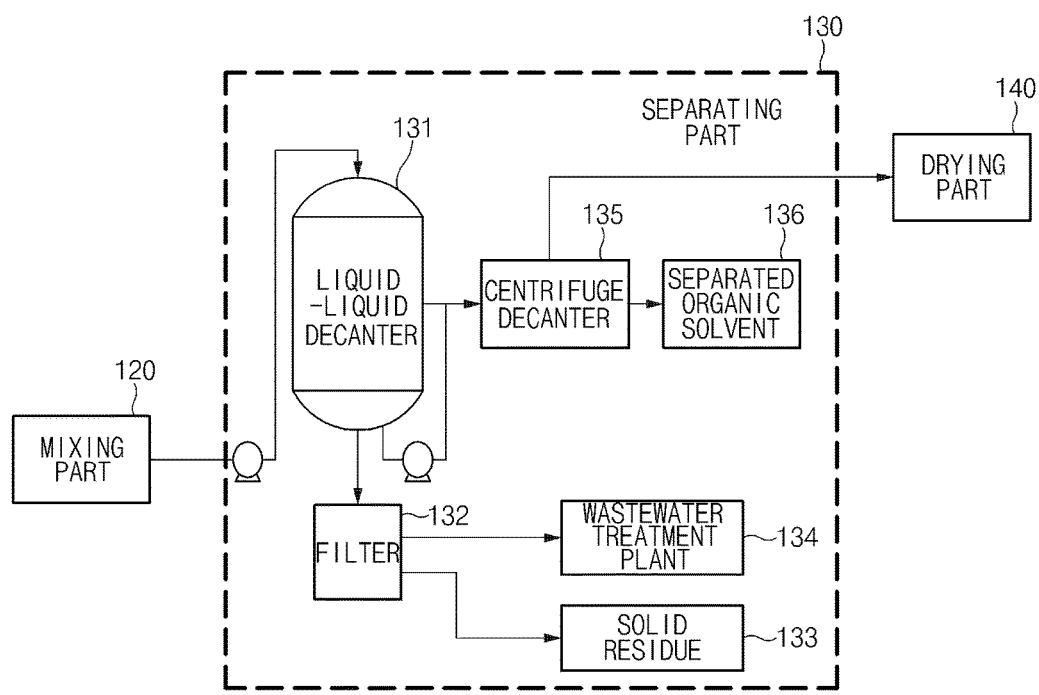
FIG. 2 is a view illustrating specific constituents of a separating part in the system for preparing the silica aerogel according to an embodiment of the present invention.
Figure 3:
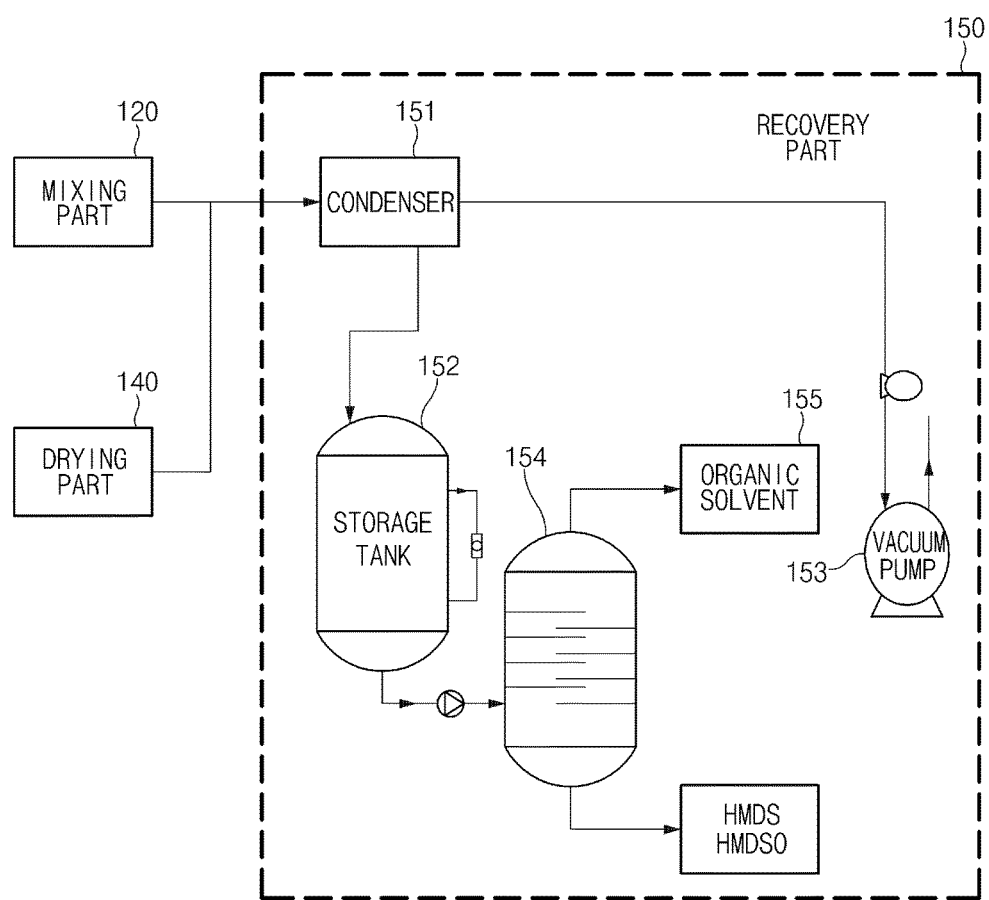
FIG. 3 is a view illustrating specific constituents of a recovery part in the system for preparing the silica aerogel according to an embodiment of the present invention.

FIG. 1 is a block diagram illustrating a system for preparing silica aerogel according to an embodiment of the present invention. FIG. 2 is a view illustrating specific constituents of a separating part in the system for preparing the silica aerogel according to an embodiment of the present invention. FIG. 3 is a view illustrating specific constituents of a recovery part in the system for preparing the silica aerogel according to an embodiment of the present invention.

Hereinafter, a system for preparing silica aerogel according to an embodiment of the present invention will be described with reference to FIGS. 1 to 3.

Referring to FIG. 1, a system 100 for preparing silica aerogel according to an embodiment of the present invention comprises a raw material supply part 110, a mixing part 110, a separating part 130, a drying part 140, a recovery part 150, and a heat transfer part 160.

Referring to FIG. 1, the raw material supply part 110 may transfer at least one raw material of de-ionized water, water glass, a surface modifier, an inorganic acid, and an organic solvent to the mixing part 120. Only one organic solvent may be used, or two or more organic solvents may be used.

The raw material supply part 110 may mix portions of the raw materials such as the de-ionized water, the water glass, the surface modifier, the inorganic acid, and the organic solvent with each other and transfer the remaining raw materials as they are.

The de-ionized water represents water that is contained in water to remove ions. The water glass is a dark aqueous solution of sodium silicate (liquid phase) obtained by melting silicon dioxide and alkali. The water glass may be obtained by melting a mixture of silica sand and soda ash at a temperature of 1,300° C. to 1,500° C. and then processing the melted mixture in a low pressure steam cooker.

The water glass is not particularly limited, but may contain 28% by weight to 30% by weight of silica ($SiO_2$). Also, a water glass solution may contain 0.1% by weight to 10% by weight of silica.

The de-ionized water and the water glass are stored in corresponding storage containers, respectively. Then, the de-ionized water and the water glass may be transferred from the storage containers to the mixing part 120 through tubes, respectively. When a valve is installed in an intermediate portion of each of the connection tubes, an amount of each of de-ionized water and water glass may be adjusted.

In general, silica wet gel prepared by using the water glass may have a hollow filled with water that is a solvent. The silica wet gel may be referred to as silica hydrogel. However, when the solvent is removed through a drying process, the liquid solvent may be vaporized into a gas phase, to cause contraction and cracks of a porous structure due to high surface tension of the water in a gas/liquid interface. As a result, in the finally prepared silica aerogel, reduction in specific surface area and a change in porous structure occur.

Thus, to maintain the porous structure of the wet gel, it is necessary not only to substitute an organic solvent having relatively low surface tension for the water relatively high surface tension, but also to dry the wet gel without being contracted while maintaining the structure of the wet gel as it is. When the hollow of the silica wet gel is filled with the nonpolar organic solvent, the silica wet gel may be referred to as silica lyogel.

The nonpolar organic solvent may be substituted for the water existing in the hollow of the prepared silica wet gal to prevent construction and cracks of the pores, which occurs during vaporization of the water existing in the hollow of the wet gel when the silica wet gel is dried, from occurring. As a result, the reduction in specific surface area and the change in porous structure, which occur when the silica wet gel is dried, may be prevented from occurring.

The organic solvent may comprise at least one kind selected from the group consisting of hexane, heptane, toluene, and xylene, but is not limited thereto. In more detail, the organic solvent may be hexane.

The dried silica aerogel may maintain low thermal conductivity just after being dried, but a hydrophilic silanol group (Si—OH) existing on a surface of the silica may absorb water in the air to gradually increase in thermal conductivity. Thus, to maintain the low thermal conductivity, it is necessary to modify the surface of the silica aerogel to be hydrophobic.

An organosilicon compound may be used as a surface modifier that is capable of being used when the silica wet gel is prepared. Particularly, a silane-based compound, a siloxane-based compound, a silanol-based compound, or a silazane-based compound may be used as the surface modifier. Here, one kind thereof may be used alone, or a mixture of two or more kinds thereof may be used.

Specific examples of the silane-based compound may comprise dimethyl dimethoxy silane, dimethyl diethoxy silane, methyl trimethoxy silane, vinyl trimethoxy silane, phenyl trimethoxy silane, tetra ethoxy silane, dimethyl dichloro silane, 3-aminopropyl triethoxy silane, and the like.

Specific examples of the siloxane-based compound may comprise polydimethyl siloxane, polydiethyl siloxane, octamethyl cyclotetra siloxane, and the like.

Specific examples of the silanol-based compound may comprise trimethyl silanol, triethyl silanol, triphenyl silanol, t-butyldimethyl silanol, and the like.

Also, specific examples of the silazane compound may comprise 1,2-diethyldisilazane, 1,1,2,2-tetramethyldisilazane, 1,1,3,3-tetramethyl disilazane, hexamethyldisilazane, 1,1,2,2-tetraethyldisilazane, 1,2-diisopropyldisilazane, and the like.

Also, the surface modifier may be a hydrated organosilicon compound. When the hydrated organosilicon compound is used as described above, reactivity with the silica may increase to more effectively perform the surface modification. As a result, hydrophobic silica aerogel having significantly improved tap density characteristic and specific surface area while maintaining excellent hydrophobicity may be prepared.

More particularly, in consideration of the surface modification efficiency and thus the hydrophobicity increasing effect on the silica wet gel, the surface modifier may comprise at least one kind selected from the group consisting of hexamethyldisilazane, tetramethyldisilazane, and, hydrates thereof, and more specifically, hexamethyldisilazane (HMDS).

An inorganic acid usable for preparing the silica wet gel may comprise at least one kind of acid selected from the group consisting of nitric acid, hydrochloric acid, acetic acid, sulfuric acid, and hydrofluoric acid, and particularly, the inorganic acid may be nitric acid ($HNO_3$).

The inorganic acid may rapidly react with the surface modifier to decompose the surface modifier. Thus, reaction between the water glass solution and the surface modifier may be promoted to form surface hydrophobic silica sol. Also, the inorganic acid may promote gelation of the hydrophobic silica sol by adjusting a pH thereof. Thus, the hydrophobic silica wet gel may be prepared by simultaneously inducing the surface modification and the gelation.

The mixing part 120 may mix the raw materials transferred from the raw material supply part 110 to produce the silica wet gel. The mixing part 120 may comprise a motor (not shown) and a mixing tank (not shown). In the mixing tank, the raw materials transferred from the raw material supply part 110 may be mixed by a stirring blade that rotates by the motor. While the mixing process is performed, the silica wet gel may be produced in the mixing tank. A temperature sensor for measuring a temperature may be provided in the mixing tank.

The silica wet gel produced in the mixing part 120 may be transferred to the drying part 140 via the separating part 130. For this, the mixing part 120, the separating part 130, and the drying part 140 may be connected to each other through the tubes. Also, to control an amount of silica wet gel to be transferred, a valve may be installed in each of the connection tubes.

The separating part 130 may separate at least one raw material of the raw materials from the mixture containing the silica wet gel transferred from the mixing part 120.

Referring to FIG. 2, the separating part 130 may comprise a water separator 131 for separating water from the mixture transferred from the mixing part 120. The water separator 131 may separate the water by using a difference in specific gravity. Particularly, the water separator 131 may be a liquid-liquid decanter that is a mechanism for separating a plurality of liquids by using a difference in specific gravity.

When the mixture is introduced into the liquid-liquid decanter, the mixture is largely divided into two layers of water and an organic solvent within the liquid-liquid decanter. The organic solvent may be provided as an upper layer, and the water may be provided as a lower layer. This is due to a difference in specific gravity between the water and the organic solvent.

The water and the organic solvent may be layered as if water and oil are layered without being mixed with each other. Here, the silica wet gel may be mixed in the organic solvent forming the upper layer, but may not be substantially mixed in the water forming the lower layer.

When a lower valve of the liquid-liquid decanter is opened, the lower layer, i.e., the water may be discharged and thus effectively separated. When the water is completely discharged, only the organic solvent forming the upper layer may remain in the liquid-liquid decanter.

Although other impurities that are dissolved in the water are contained somewhat in the separated water, the separated water may be discharged into a wastewater treatment plant 134 via a filter 132. When the water passes through the filter 132, a solid residue 133 may be filtered. The filtered water may be purified with pure water in the wastewater treatment plant 134. Thereafter, the purified water may also be reused for the system for preparing the silica aerogel.

The separating part 130 may further comprises an organic solvent separator 135 for additionally separating the organic solvent from the organic solvent mixture in which the silica wet gel passing through the water separator 131 is mixed.

The organic solvent separator 135 may be separate the organic solvent by using centrifugal force. Particularly, the organic solvent separator 135 may be a centrifuge decanter.

The centrifuge decanter may separate the silica wet gel and the organic solvent from each other by using the centrifugal force. This may be the same principle as centrifuging as if water is separated from laundry in a washing machine.

In more detail, the water separated and discharged from the washing machine may correspond to the organic solvent, and the remaining clothes may correspond to the silica wet gel.

The organic solvent 136 separated from the centrifuge decanter may be separately collected and then reused as a raw material in the system for preparing the silica aerogel. Also, the silica wet gel separated in the centrifuge decanter may be transferred to the drying part 140.

Then, the silica wet gel may be dried in the drying part 140 to produce the silica aerogel. Here, since an amount of organic solvent to be removed by being vaporized in the drying part 140 is significantly small due to the role of the separator 130, the drying part 140 may be improved in performance.

The technique of separating the water by using the liquid-liquid decanter or the technique of separating the organic solvent by using the centrifuge decanter may significantly increase in recovery rate of the used raw materials and be reduced in energy cost for required for preparing the silica aerogel. Thus, the silica aerogel may be efficiently prepared.

If the liquid-liquid decanter or the centrifuge decanter is not used, since all the water and organic solvent have to be removed by being vaporized by heat, a lot of energy costs may be required.

In comparison, since the liquid-liquid decanter separates the water by using the difference in specific gravity, and the centrifuge decanter separates the organic solvent by using mechanical force, relatively much lower energy costs may be used to perform the separation.

In addition, although it is difficult to recover the water or the organic solvent, which is vaporized into a gas, the liquid-liquid decanter or the centrifuge decanter may more easily and effectively recover the raw material, and thus, the recovery rate may significantly increase, and the costs may be significantly reduced.

The drying part 140 dries the silica wet gel transferred from the separating part 130 to produce the silica aerogel. The drying part 140 may comprise a motor (not shown) and a drying tank (not shown). In the drying tank, the drying of the silica wet gel may be performed by rotation of a stirring blade that rotates by the motor. In this case, the silica aerogel having the form of powder may be produced.

The system 100 for preparing the silica aerogel according to an embodiment of the present invention may further comprise a collecting part 170 that collects the silica aerogel powder produced in the drying part 140.

The drying part 140 and the collecting part 170 may be connected to each other through the tube. Here, a valve may be installed in an intermediate portion of the connection tube. The valve may be controlled in switching to adjust an amount of silica aerogel transferred from the drying part 140 to the collecting part 170.

The recovery part 150 recovers a portion of the vaporized raw material of the raw materials used in at least one of the mixing part 120 and the drying part 140. Particularly, the recovery part 150 may mainly recover the organic solvent vaporized in the mixing part 120 and the drying part 140. The recovery part 150 may comprise a condenser 151, a storage tank 152, and a vacuum pump 153.

The condenser 151 may liquefy the vaporized and recovered raw material, and the storage tank 152 may store the raw material such as the organic solvent liquefied in the condenser 151. The storage tank 152 may also receive the corresponding liquefied raw material from the condenser 151 at a position that is away from the condenser 151 to store the raw material. The vacuum pump 153 may be used to control a pressure of each of the condenser 151 and the storage tank 152.

When the organic solvent vaporized while the drying process is performed is recovered by the recovery part 150, a filter may be provided in the drying part 140 so that the silica aerogel powder is not recovered.

In the system 150 for preparing the silica aerogel according to an embodiment of the present invention, the recovery part 150 may further comprise a solvent separating device 154 that separates the organic solvent from the raw material stored in the storage tank 152. The solvent separating device 154 may be a device for separating the organic solvent by using a difference in boiling point. Particularly, the solvent separating device 154 may be a device for separating the organic solvent by using a distillation column. Here, the distillation column may be one of devices for separating a mixed liquid mixture from each other by using a difference in boiling point.

The liquefied raw material stored in the storage tank 152 may be transferred to the distillation column and then separated into a plurality of raw materials by the difference in boiling point. The organic solvent 155 may be separated from an upper portion of the distillation column due to its low boiling point. The organic solvent may be discharged in a gaseous sate from the upper portion of the distillation column. The organic solvent may be recovered from the upper portion of the distillation column through the above-described manner. The recovered organic solvent may be a pure organic solvent.

Also, a surface modifier (HMDS) having a relatively high boiling point or a surface modifier (HMDSO) that is in an oxidized state may be recovered from a lower portion of the distillation column. The surface modifier (HMDS) or the surface modifier (HMDSO) that is in the oxidized state may be separated in a liquid state from the lower portion of the distillation column.

When the raw materials are recovered through the above-described manner, the recovering rate of the used raw materials may increase to improve costs of the product.

The system 100 for preparing the silica aerogel according to an embodiment of the present invention may further comprise the heat transfer part 160 that transfers heat to at least one of the mixing part 120 and the drying part 140. The heat transfer part 160 represents a heater for transferring hot wind to the mixing part 120 and the drying part 140.

The solvent substitution and the gelation performed in the mixing part 120 may be affected by an ambient temperature. Here, it is preferable to perform the solvent substitution and the gelation at an atmosphere of a temperature of 30° C. to 40° C. The heat transfer part 160 may provide a heat medium or hot wind as a medium for heating the mixing part 120.

The drying process performed in the drying part 140 may be affected by a temperature. In general, the drying process may have highest efficiency at room temperature to 150° C. The heat transfer part 160 may also transfer heat to the drying part 140.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A system for preparing silica aerogel, the system comprising:
a raw material supply part transferring at least one raw material of de-ionized water, water glass, a surface modifier, an inorganic acid, and an organic solvent to a mixing part;
the mixing part mixing the raw materials transferred from the raw material supply part to produce silica wet gel;
a separating part comprising:
a liquid-liquid decanter attached to the mixing part for separating water from the mixture containing the organic solvent and silica wet gel transferred from the mixing part;
a drying part drying the silica wet gel transferred from the separating part to produce the silica aerogel;
a recovery part recovering a portion of the vaporized raw material of the raw materials used in at least one of the mixing part and the drying part; and
a heat transfer part transferring heat to at least one of the mixing part and the drying part.

2. The system of claim 1, wherein the inorganic acid is nitric acid ($HNO_3$),
the organic solvent is hexane, and
the surface modifier is hexamethyldisilazane (HMDS).

3. The system of claim 1, wherein the liquid-liquid decanter separates the water by using a difference in specific gravity.

4. The system of claim 1, wherein the separating part further comprises an organic solvent separator that separates the organic solvent from the mixture passing through the water separator.

5. The system of claim 4, wherein the organic solvent separator separates the organic solvent by using centrifugal force.

6. The system of claim 1, wherein silica aerogel powder is produced in the drying part, and
the system further comprises a collecting part that collects the silica aerogel powder.

7. The system of claim 1, wherein the recovery part comprises:
a condenser that liquefies the raw material recovered in a gas state;
a storage tank receiving the raw material liquefied in the condenser to store the raw material; and
a vacuum pump controlling a pressure of each of the condenser and the storage tank.

8. The system of claim 7, wherein the recovery part further comprises a solvent separating device that separates an organic solvent from the raw material stored in the storage tank.

9. The system of claim 8, wherein the solvent separating device separates the organic solvent by using a difference in boiling point.

10. The system of claim 9, wherein the solvent separating device comprises a distillation column,
the organic solvent is recovered from an upper portion of the distillation column, and
the surface modifier or the surface modifier that is in an oxidized state is recovered from a lower portion of the distillation column.

* * * * *